Nov. 18, 1930. J. W. SIMMONS Re. 17,871

COMBINED TRANSFORMER AND ELECTRON TUBE SOCKET

Original Filed April 30, 1923

INVENTOR

John W. Simmons,

BY

ATTORNEY

Reissued Nov. 18, 1930

Re. 17,871

UNITED STATES PATENT OFFICE

JOHN W. SIMMONS, OF CLEVELAND, OHIO, ASSIGNOR, BY MESNE ASSIGNMENTS, TO ROBERT S. ALLYN, OF NEW YORK, N. Y.

COMBINED TRANSFORMER AND ELECTRON-TUBE SOCKET

Original No. 1,535,261, dated April 28, 1925, Serial No. 635,805, filed April 30, 1923. Application for reissue filed March 22, 1927. Serial No. 177,456.

My invention relates broadly to electron tube apparatus employed in radio and wire telegraphy and telephony and other electrical arts, and more particularly to a combined construction of electron tube socket and transformer.

One of the objects of my invention is to provide a compact arrangement for an electron tube socket mounting and the coupling means which is normally associated with the circuits containing the elements of the electron tube, whether said coupling means comprises a conductively connected impedance, reactance auto-transformer, or inductive transformer device.

Another object of the invention is to improve the general efficiency of the electron tube circuit by reducing to a minimum the length of the connecting busses between the electron tube elements and the transformer windings when the tubes are employed singly or in cascade arrangement.

Another object of the invention is to provide a combined electron tube socket mounting and transformer wherein a maximum amount of energy is inductively transferred from the primary winding to the secondary winding with minimum losses existing from capacity effects so predominant in arrangements of sockets and transformers where leads of substantial length are run between the connections on the tube socket and the terminals on the transformer mounting.

Another object of the invention is to provide a construction of transformer for mounting within the base, exteriorly of the base or circumferentially upon that portion of the socket enclosing the base of the tube proper in standard forms of electron tube sockets.

Figure 1:
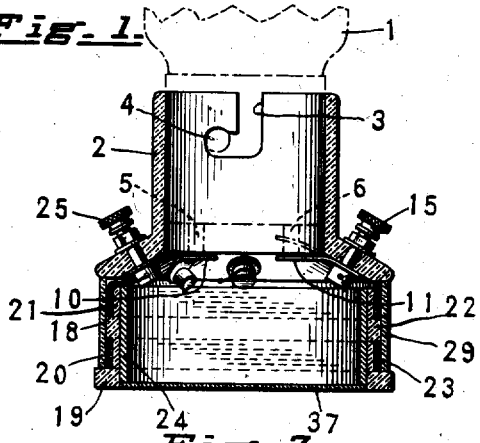
Figure 2:
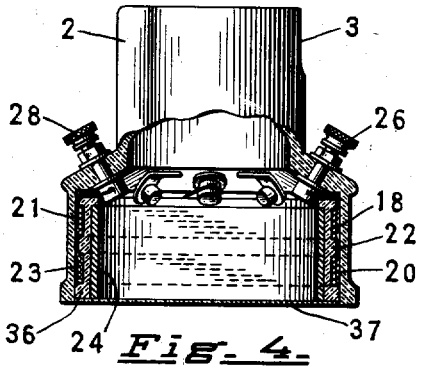
Figure 3:
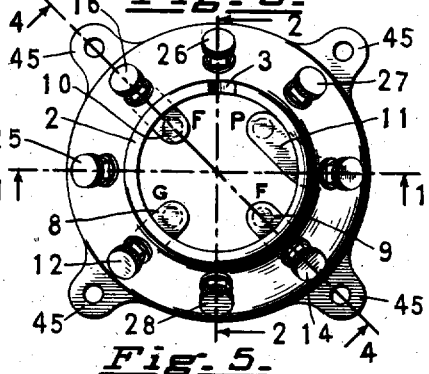
Figure 4:
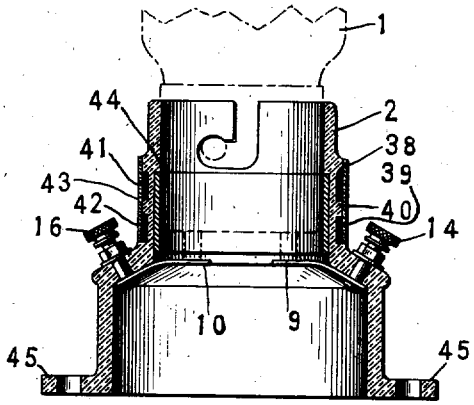
Figure 5:
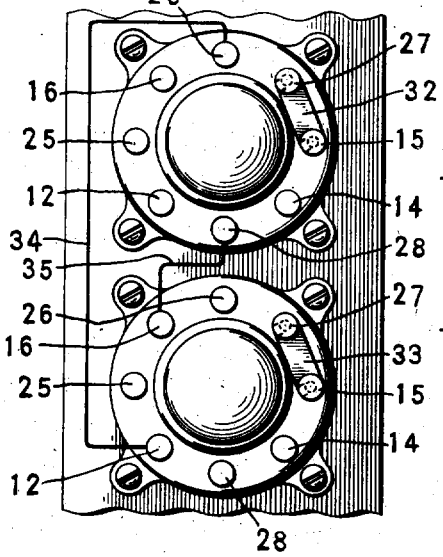
Figure 6:
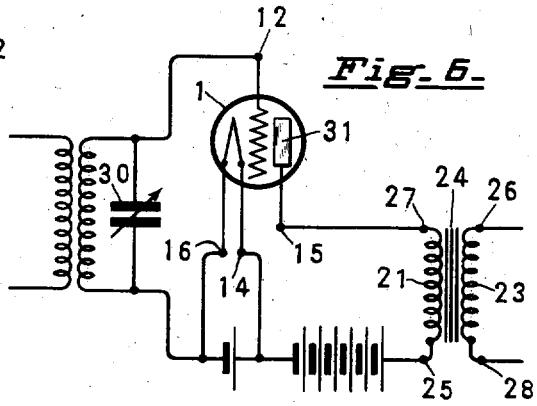

Other and further objects of my invention will be understood from the following specification with reference to the accompanying drawings, in which:

Fig. 1 is a cross sectional view of one form of my combined electron tube socket mounting and transformer with its windings positioned upon the exterior of the base of the socket; Fig. 2 is a partial cross sectional view of a modified form of my combined electron tube socket mounting and transformer wherein the transformer is slipped as a unit within the base of the socket; Fig. 3 is a plan view of my combined electron tube socket mounting and transformer showing one arrangement of terminals for the electron tube elements and windings on the transformer; Fig. 4 is a cross sectional view on line 4—4 of Fig. 3 showing a modified arrangement of my electron tube socket mounting and transformer wherein the transformer windings are arranged about that portion of the socket which encloses the electron tube base proper; Fig. 5 is a schematic view showing the closely related arrangements of a plural number of electron tube sockets with interconnected transformers which is possible in my construction of combined socket and transformer; and Fig. 6 is a wiring diagram illustrating an electron tube with connections to its associated transformer.

Heretofore in the art it has been the practice to assemble electron tubes and transformers interconnecting the output circuit of one tube with the input circuit of a succeeding tube assembled at substantial distances between the tubes and the transformers. This has been necessary by reason of the separate construction of the tube sockets and the mountings for the transformers. The separation has inherently involved an increase in capacity between the electron tube circuits with a decrease in the overall efficiency. The physical space occupied in the broadcast receiver has been necessarily large when employing prior constructions, and the reduction in space accomplished by my construction with inherent improvement in operation are particular features of my invention.

Referring more particularly to the drawings, I have illustrated the invention as showing a combined radio frequency amplifying transformer and an electron tube socket mounting. It is to be expressly understood that my invention is not limited to the radio frequency amplifying transformer construction for an audio frequency transformer may be used in my combined construction with equally satisfactory results.

Reference character 1 indicates an electron tube secured within a standard socket 2 by means of bayonet slot 3 and cooperating pin 4, or by any other suitable means. The contact pins represented at 5 and 6 on the base of the tube 1 forming connections for the electron tube elements may be secured either in sockets or may contact with resilient leaf springs 8, 9, 10 and 11 secured by binding posts 12, 14, 15 and 16 in the wall of the socket mounting 2.

In Fig. 1 of the drawings I have shown the radio frequency transformer with its windings arranged on the exterior of the lower portion of the socket 2. Grooves 18 and 20 are formed circumferentially around the base portion 19. The primary winding 21 is wound in groove 18 and spaced from this winding by the thickness of the wall 22, which is determined in accordance with the coupling factor to be secured. The secondary winding 23 is formed in groove 20. A cylindrical band iron core 24 is provided within the base of the tube socket 2 adjacent the primary and secondary windings 21 and 23 insulated from the windings by the thickness of the wall of the base. Connections are made from the primary and secondary windings with binding posts 25, 26, 27 and 28 arranged upon the socket mounting 2. A band 29 is wrapped over the exterior of the primary and secondary windings substantially protecting the same. The primary winding of the transformer having one end in common with the plate electrode of the electron tube within the socket may be directly connected with the leaf spring contacting with the pin which forms the plate electrode terminal as indicated in Fig. 6. In this diagram electron tube 1 has its input electrodes connected to the tuned input circuit 30. The plate electrode 31 is directly connected to the primary winding 21 within the socket, or it may be so connected by means of busses 32 and 33 represented in the schematic view in Fig. 5, and in all cases the connection between the plate electrode and the primary winding 21 is extremely short.

In assembling the electron tubes in a multistage amplifying circuit with interval transformers the sockets are secured adjacent each other on a common base 33 as represented in Fig. 5 and only extremely short leads 34 and 35 are necessary in connecting the secondary winding in the first transformer with the input electrodes of the succeeding electron tube.

In Fig. 2 I have illustrated a modified form of my invention in which the transformer is wound upon an insulated shell 36 and slipped within the base of the socket 2 and secured therein by suitable insulating material 37 such as wax. The transformer is provided as before with a core 24.

In Fig. 4 I have shown the transformer arrangement about that portion of the socket 2 which encloses the base of the tube 1. Grooves 38 and 39 are formed in the socket 2 spaced apart by a rib or flange 40. Primary winding 41 is arranged in groove 38 and secondary winding 42 is arranged in groove 39. A protecting cover 43 is placed over the transformer windings. Iron core 44 is provided and the windings spaced therefrom by the thickness of the wall of the socket. The socket is arranged for mounting upon any suitable base and may be provided with lugs 45 for this purpose.

While I have described my invention in the particular embodiment of a radio frequency transformer, an audio frequency transformer may be suitably arranged within the socket as heretofore described, and the coupling device may be conductively arranged in the intervalve circuits as an impedance, reactance or autotransformer and the terms of the claims are accordingly to be interpreted with this in mind. I intend no limitations upon the invention other than are imposed by the scope of the appended claims so interpreted. The amplifier construction in which the coupling device is housed within the base of the tube socket is claimed specifically in case B filed herewith.

What I claim and desire to secure by Letters Patent of the United States is:

1. In an electron tube apparatus the combination of an electron tube socket having a plurality of terminals, a plurality of grooves formed in said socket and spaced from each other, a primary winding wound in one of said grooves, a secondary winding wound in the other of said grooves, and a short connection between one of said terminals and said primary winding.

2. In an electron tube apparatus the combination of an electron tube socket, a cylindrical base on said socket, terminals carried thereby, a cylindrical transformer concentrically positioned relative to said base, said transformer including a pair of windings, a cylindrical core located within said windings and extremely short connections between said transformer and said terminals whereby capacity effects are substantially eliminated.

3. In an electron tube apparatus the combination of an electron tube socket, a plurality of terminals for said socket, a cylindrical portion having grooves therein, a primary and secondary winding arranged in said grooves on one side of said cylindrical portion, an iron core adjacent said windings on the opposite side of said cylindrical portion, and connections between said windings and said terminals.

4. An electron tube apparatus comprising a socket arranged to receive an electron tube, terminals carried by said socket and arranged to establish connections with an electron tube inserted in said socket, a cylindrical transformer comprising a grooved rim, a core concentric therewith, and windings on said rim, said transformer being carried by a portion of said socket whereby extremely short connections may be made with said terminals.

JOHN W. SIMMONS.